(12) United States Patent
Ikeda et al.

(10) Patent No.: US 7,061,649 B2
(45) Date of Patent: Jun. 13, 2006

(54) PAGE DATA PROCESSOR, PAGE DATA PROCESSING METHOD AND PROGRAM

(75) Inventors: Iwata Ikeda, Kyoto (JP); Takako Kato, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 182 days.

(21) Appl. No.: 10/262,959

(22) Filed: Oct. 3, 2002

(65) Prior Publication Data

US 2003/0067463 A1 Apr. 10, 2003

(30) Foreign Application Priority Data

Oct. 5, 2001 (JP) .................................. 2000-309687

(51) Int. Cl.
- G06F 3/00 (2006.01)
- G06F 9/00 (2006.01)
- G06F 17/00 (2006.01)
- G06F 15/00 (2006.01)

(52) U.S. Cl. .................... 358/1.9; 715/748; 715/764
(58) Field of Classification Search ............... 358/1.9, 358/1.4, 1.3, 1.15, 1.16, 296, 1.14, 1.13, 358/1.2; 715/748, 764, 526; 345/423, 748, 345/418; 346/134; 382/232; 710/64, 53
See application file for complete search history.

(56) References Cited

U.S. PATENT DOCUMENTS

| | | | | |
|---|---|---|---|---|
| 5,982,937 A | * | 11/1999 | Accad | 382/239 |
| 6,100,998 A | * | 8/2000 | Nagao et al. | 358/1.9 |
| 6,337,747 B1 | * | 1/2002 | Rosenthal | 358/1.15 |
| 6,583,887 B1 | * | 6/2003 | Clouthier et al. | 358/1.15 |

FOREIGN PATENT DOCUMENTS

| | | |
|---|---|---|
| EP | 0 513 775 A2 | 11/1992 |
| JP | 2001-270199 | 10/2001 |

* cited by examiner

*Primary Examiner*—Kee M. Tung
*Assistant Examiner*—Dalip K. Singh
(74) *Attorney, Agent, or Firm*—McDermott Will & Emery LLP

(57) ABSTRACT

A page data processor capable of reducing a dead time or an output interrupting time of an output unit calculates an output start time in the output unit from a time necessary for rasterizing page data and a time necessary for outputting output data generated by the rasterization processing. The page data processor also generates a plurality of output files by dividing the output data every time the rasterized output data reaches a prescribed data size, and transmits the same to the output unit in units of the output files at the output start time. Thus, the page data processor can reduce the dead time of the output unit for improving the efficiency of printing/prepress steps.

7 Claims, 5 Drawing Sheets

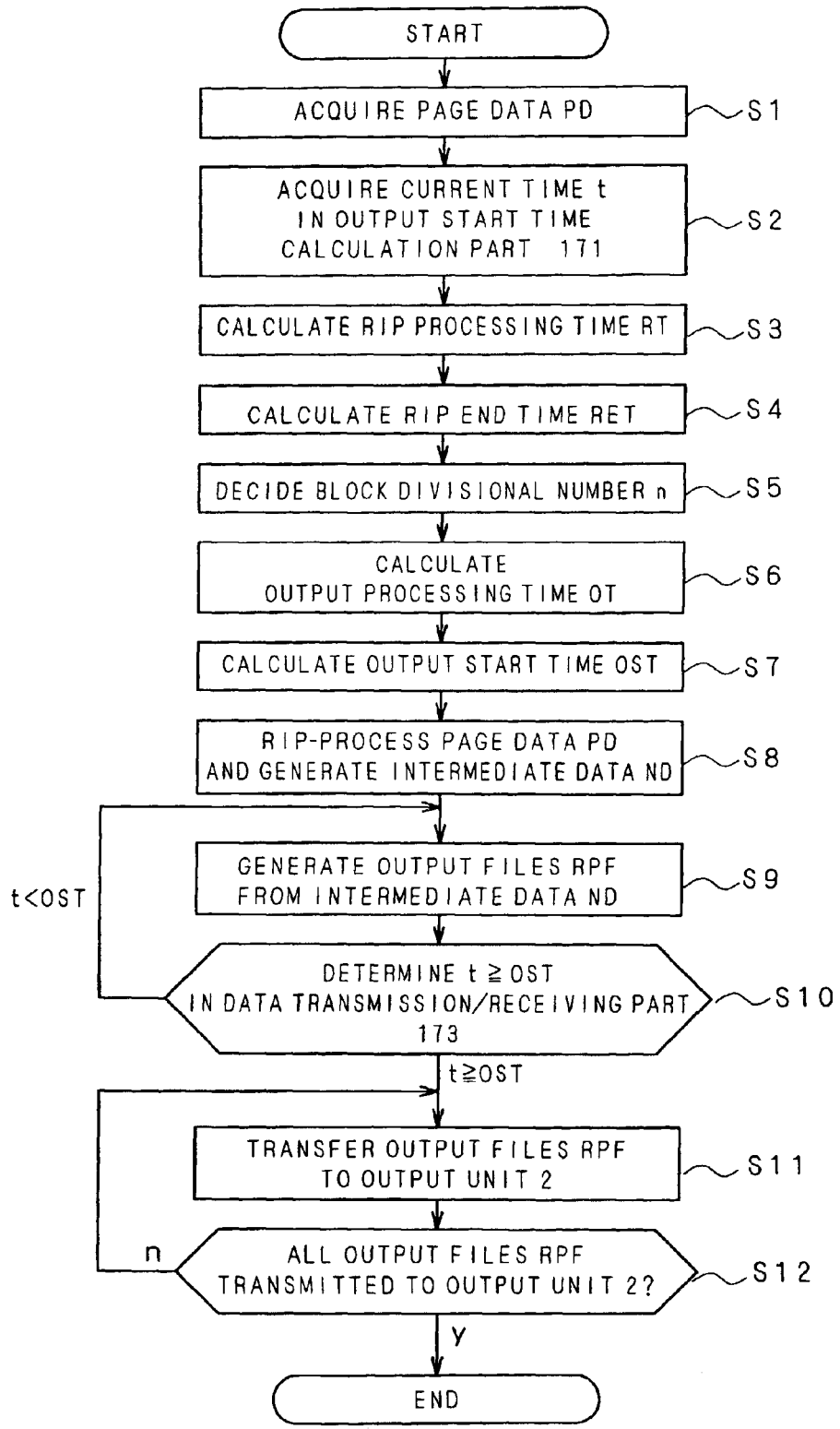

FIG. 3A

| OPERATOR | NUMBER |
|---|---|
| erasepage | 1 |
| fill | 100 |
| eofill | 100 |
| stroke | 500 |
| ufill | 10 |
| ueofill | 50 |
| ustroke | 10 |
| rectfill | 20 |
| rectstroke | 30 |

FIG. 3B

| No. | width (pix) | height (pix) | Bit per Compo | multi | rot |
|---|---|---|---|---|---|
| 1 | 100 | 500 | 3 | 8 | 0° |
| 2 | 300 | 300 | 1 | 8 | 90° |
| 3 | 100 | 250 | 1 | 8 | 180° |
| 4 | 500 | 500 | 1 | 8 | OTHERS |

PAGE DATA PROCESSOR, PAGE DATA PROCESSING METHOD AND PROGRAM

BACKGROUND OF THE INVENTION

1. Field of the Invention

The present invention relates to a page data processor rasterizing page data for generating output data and outputting the output data to an output unit such as an image setter, a plate recorder or a digital printing machine, a page data processing method and a program.

2. Description of the Background Art

In the field of printing/prepress, an image processor generally rasterizes page data described in a page description language (hereinafter abbreviated as "PDL") represented by PostScript (registered trademark of Adobe Systems Inc., U.S.A.) or PDF (portable document format) for generating output data and outputs page contents expressed by the page data to a recording medium such as a film, a printing plate or a paper through an output unit such as an image setter, a plate writer or a digital printing machine.

In this case, the image processor first rasterizes the page data for generating the output data, and thereafter transfers the generated output data to the output unit. According to this processing, however, the output unit cannot perform output operation before receiving the output data from the image processor but must remain in a dead time to perform no operation, leading to a problem in improvement of the efficiency of printing/prepress steps.

To this end, there is an attempt of analyzing the page data and calculating the time required for rasterization processing for rasterizing the page data from that requiring a short rasterization processing time and generating output data thereby reducing the dead time of the output unit and prompting improvement of the efficiency of the printing/prepress steps.

In this case, however, the sequence of pages is disadvantageously disordered due to generation of the output data from the page data requiring the short rasterization processing time, although the dead time of the output unit can be reduced.

In another attempt, the dead time of the output unit is reduced by a technique, referred to as "on-the-fly system", of sequentially transferring output data generated by rasterizing page data to the output unit.

According to this technique, however, it follows that transfer of the output data to the output unit is interrupted when the contents expressed by the page data are so complicated that a long time is required for generating output data by rasterization processing, disadvantageously leading to interruption of output processing, i.e., an output interrupting time.

Further, the output unit cannot operate immediately after starting but requires a preparatory time for transporting the recording medium to a recording part or warming up the recording part, and hence the dead time of the output unit must be reduced in consideration of the preparatory time.

SUMMARY OF THE INVENTION

The present invention is directed to a page data processor processing page data described in a page description language.

A page data processor according to the present invention comprises a) a rasterization processing element rasterizing page data and generating output data output-processible by an output device, b) a data transmission element transmitting the said output data to the said output device, c) a first time calculation element calculating a rasterization processing time necessary for generating the said output data, d) a second time calculation element calculating an output processing time required by the said output device for output-processing the said output data, and e) an output start time calculation element calculating an output start time for starting outputting the said output data from the said output device on the basis of the current time, the said rasterization processing time and the said output processing time, while the said data transmission element transmits the said output data to the said output device at the said output start time.

According to a preferred embodiment of the present invention, the page data processor can start actual rasterization processing after previously calculating the said rasterization processing time and the said output processing time and further calculating the output processing start time for starting output processing by the said output device at timing with the best processing efficiency, whereby a dead time of the said output device can be reduced for improving efficiency of printing/prepress steps.

Preferably, the said rasterization processing element further comprises a data division element, and the said data division element divides the said output data into output files for transmitting the said output data to said output device in units of the said output files.

Thus, the said output device may not buffer the output data, while the operation of the said output device is not interrupted following a transmission wait for the said output data from the said page data transmission element.

Accordingly, an object of the present invention is to provide a page data processor capable of reducing a dead time or an output interrupting time of an output device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a flow chart for illustrating operation of the page data processor 1;

FIGS. 3A and 3B illustrate exemplary sequential analysis of description of page data PD made by an RIP processing time calculation part 1711;

DESCRIPTION OF THE PREFERRED EMBODIMENTS

An embodiment for illustrating the present invention is now described.

Figure 1:
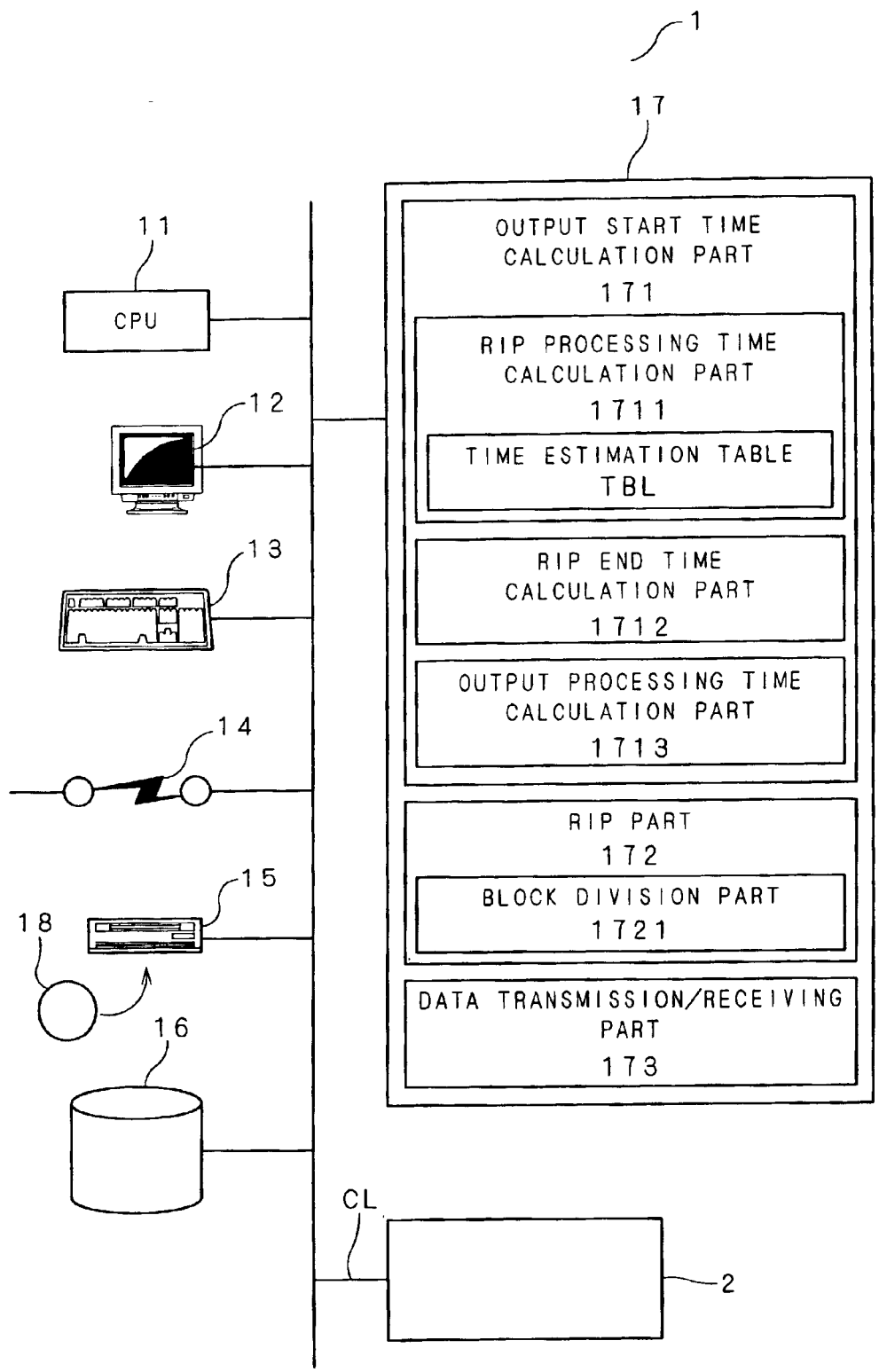
FIG. 1 is a diagram for illustrating the structure of a page data processor 1 according to an embodiment of the present invention.

FIG. 1 is a diagram for illustrating the structure of a page data processor 1 according to this embodiment. The page data processor 1 is a generally employed personal computer formed by a CPU 11, a display part 12, an input part 13, a network I/F 14, a media drive 15, a storage part 16 and a memory 17. The CPU 11 controls the overall page data processor 1 and runs a program recorded in a media disk 18 inserted into the media drive 15 in the memory 17 in particular, thereby implementing functions of the page data processor 1. The display part 12 is employed for displaying information necessary for image processing. The input part 13 formed by a mouse and a keyboard is employed by an operator for inputting instructions in the page data processor 1. The network I/F 14 is employed for connecting the page data processor 1 with a network (not shown). The page data processor 1 can receive page data PD necessary for image processing from a terminal (not shown) connected to the network through the network I/F 14. It is also possible to download a program implementing the functions of the page data processor 1 from a server (not shown). The page data processor 1 transmits output data RPD to an output unit 2 through the network I/F 14. The media drive 15 is employed for reading the program recorded in the media disk 18. The program read by the media drive 15 implements the functions of the page data processor 1. The storage part 16 stores the program read by the media drive 15. The storage part 16 also records the page data PD and a plurality of output files RPF described later. A communication line CL connecting the page data processor 1 and the output unit 2 with each other is employed for communication between the page data processor 1 and the output unit 2. More specifically, the page data processor 1 transmits the plurality of output files RPF and an output start signal OD to the output unit 2. The output unit 2 transmits control information CD such as an output preparatory time, a notification of an output ready state, the number of pixels output per second etc. necessary for outputting the plurality of output files RPF to the page data processor 1.

The memory 17 is a work area used by the CPU 11 for running the program stored in the storage part 16. When the CPU 11 runs the program, the memory 17 consequently implements the functions of an output start time calculation part 171, an RIP part 172 and a data transmission/receiving part 173.

The output start time calculation part 171 calculates an output start time for the output data RPD in the output unit 2. Therefore, the output start time calculation part 171 comprises an RIP processing time calculation part 1711, an RIP end time calculation part 1712 and an output processing time calculation part 1713.

The RIP processing time calculation part 1711 analyzes the page data PD described in a page description language (PDL) and calculates an RIP processing time RT necessary for performing rasterization processing (RIP processing) on the basis of the described contents. Therefore, the RIP processing time calculation part 1711 comprises a time estimation table TBL storing processing times related to respective drawing operators (drawing instructions) and processing coefficients related to image processing times.

The RIP end time calculation part 1712 calculates the end time of the RIP processing. This RIP end time calculation part 1712 calculates an RIP end time RET in a case of starting the RIP processing from the current time through the RIP processing time RT calculated in the RIP processing time calculation part 1711 and the current time.

The output processing time calculation part 1713 analyzes the page data PD described in the PDL, similarly to the RIP processing time calculation part 1711. This output processing time calculation part 1713 obtains the output size of intermediate data ND generated as a result of the RIP processing on the basis of the described contents, thereby calculating an output processing time OT necessary for performing output processing in the output unit 2.

The output start time calculation part 171 obtains an output start time OST for starting outputting the plurality of output files RPF generated by the RIP processing in the output unit 2 from the RIP processing time RT, the RIP end time RET and the output processing time OT obtained by the RIP processing time calculation part 1711, the RIP end time calculation part 1712 and the output processing time calculation part 1713 respectively. The memory 17 temporarily stores the output start time OST obtained by the output start time calculation part 171.

The RIP part 172 rasterizes the page data PD and generates the intermediate data ND. The RIP part 172 interprets the described contents of the page data PD described in the PDL and generates the intermediate data ND expressing the page contents in a bit map format output-processable by the output unit 2. The format of the intermediate data ND is not restricted to the bit map format but may be a 1-bit TIFF format, for example.

The RIP part 172 comprises a block division part 1721. Every time the intermediate data ND generated by the RIP part 172 reaches a prescribed data size, the block division part 1721 divides the intermediate data ND. Each data obtained by such division and the size thereof are hereinafter referred to as a block and a block size respectively. When the intermediate data ND is expressed in the bit map format, the data size indicating the capacity of the data is substantially proportionate to a layout size expressed by the number of pixels or the area in a laid-out state, and hence necessity/nonnecessity of block division can be determined by employing either thereof as the data size. The storage part 16 preserves the respective blocks obtained by division as the output files RPF. When generation of the intermediate data ND progresses following progress of the RIP processing, it follows that the plurality of output files RPF are sequentially created in response thereto.

The plurality of output files RPF correspond to parts of the page expressed by the page data PD respectively, and the contents of the page are completed by summating partial contents of the page stored in the output files RPF respectively. In other words, the output unit 2 sequentially outputs the plurality of output files RPF, thereby recording the contents of the page corresponding to the page data PD in the recording medium.

The data transmission/receiving part 173 outputs the plurality of output files RPF generated in the RIP part 172 to the output unit 2. The data transmission/receiving part 173 continuously monitors the current time t while acquiring the output start time OST calculated in the output start time calculation part 171 from the memory 17 for sequentially outputting the output files RPF to the output unit 2 at the output start time OST.

The data transmission/receiving part 173 further receives the control information CD transmitted from the output unit 2, confirms the state of the output unit 2 and transmits the output start signal OD to the output unit 2.

FIG. 2 is a flow chart for illustrating operation of the page data processor 1.

At a step S1, the page data processor 1 stores the page data PD in the storage part 16. The page data PD is created in a page data creation part (not shown) loaded in the page data processor 1 and stored in the storage part 16. Alternatively, page data PD created in the terminal (not shown) may be stored in the storage part 16 through the network (not shown). When the storage part 16 stores the page data PD, the page data processor 1 executes a subsequent process.

At a step S2, the output start time calculation part 171 and the data transmission/receiving part 173 acquire the current time t. At this time, the operator of the page data processor 1 may input the current time t, or the current time t may be acquired from a system clock of the computer functioning as the page data processor 1. The output start time calculation part 171 acquires the current time t in order to calculate the RIP end time RET and the output start time OST (described later).

At a step S3, the RIP processing time calculation part 1711 reads the page data PD stored in the storage part 16 and analyzes the description of the page data PD thereby calculating the RIP processing time RT necessary for RIP-processing the page data PD.

If the page data PD is described in an interpreter language such as the PostScript (registered trademark of Adobe Systems Inc., U.S.A.) or the like, the numbers of respective drawing operators can be acquired every type by sequentially analyzing the description. Information related to the sizes of graphics included in the page data PD is also acquired.

If the page data PD is according to a data format such as PDF, it is possible to acquire the numbers of respective drawing operators included in the page data PD every type by reading the page data PD according to the format.

FIGS. 3A and 3B illustrate exemplary sequential analysis of the description of the page data PD made by the RIP processing time calculation part 1711.

Referring to FIG. 3A, the RIP processing time calculation part 1711 analyzes the page data PD and acquires the numbers of drawing operators such as "erasepage", "fill", "eofill", "stroke". . . described in the page data PD every type as 1, 100, 100, 500 . . . .

Referring to FIG. 3B, the RIP processing time calculation part 1711 analyzes the page data PD and acquires the sizes of graphics included in the page data PD. The page data includes four graphics Nos. 1 to 4 in this case. FIG. 3B also shows the sizes of the respective graphics with the numbers of vertical and transverse pixels.

After analyzing the description of the page data PD and acquiring information related to the numbers of the respective drawing operators every type and the sizes of the graphics, the RIP processing time calculation part 1711 calculates the time necessary for RIP-processing the page data PD, i.e., the RIP processing time RT on the basis of the acquired information.

The RIP processing time calculation part 1711 calculates the RIP processing time RT as follows:

$$RT=TS+TG \quad (1)$$

where TS represents the sum of times necessary for executing respective ones of stroke operators among the drawing operators, and TG represents the sum of times necessary for executing image operators among the drawing operators.

The time estimation table TBL stores a parameter expressing a time necessary for processing a drawing instruction of each drawing operator once. The time estimation table TBL also stores parameters expressing a processing time per unit size of each graphic and a processing time responsive to an angle of rotation, and hence the RIP processing time calculation part 1711 calculates the RIP processing time RT with reference to the time estimation table TBL.

In other words, the RIP processing time calculation part 1711 can obtain the sum TS of the times necessary for executing the respective ones of the stroke operators by adding up values obtained by multiplying processing times for single drawing instructions by the number of the instructions as to all drawing instructions as follows:

$$TS=\Sigma(TSi \times Ni) \quad (2)$$

where $TSi$ represents the time necessary for processing each drawing instruction, $Ni$ represents the number of the drawing instructions, and $\Sigma$ represents the sum of i=1, 2, . . . , M (M: the number of types of the drawing instructions).

The sum TG of the times necessary for executing the respective image operators, depending on the sizes of the respective graphics, can be obtained as follows:

$$TG=\Sigma TGi=\Sigma(SZi \times Ci \times Di) \quad (3)$$

where $SZi$ represents the size of each graphic, $Ci$ represents the processing time per unit size, and $Di$ represents a rotation factor set in response to the angle of rotation of the graphic. When graphic drawing processing includes rotation, the processing time exceeds that in general drawing processing and hence the sum TG can be more correctly calculated by being multiplied by the rotation factor $Di$ set in response to the angle of rotation.

The RIP processing time calculation part 1711 calculates the RIP processing time RT necessary for RIP-processing the page data PD according to the above formulas (1), (2) and (3). The output start time calculation part 171 temporarily stores the calculated RIP processing time RT. Alternatively, the storage part 16 may store the RIP processing time RT.

At a step S4, the RIP end time calculation part 1712 calculates the RIP end time RET for ending the RIP processing of the page data RD. The RIP end time calculation part 1712 calculates the RIP end time RET by adding the RIP processing time RT calculated by the RIP processing time calculation part 1711 at the step S3 to the current time t acquired by the output start time calculation part 171 at the step S2. In other words, the RIP end time RET is expressed as follows:

$$RET=t+RT \quad (4)$$

The RIP processing time RT may be added not to the current time t acquired at the step S2 but to the current time t acquired by the output start time calculation part 171 when carrying out the step S4.

At a step S5, the block division part 1721 decides a divisional number n for dividing the intermediate data ND into the blocks. The block division part 1721 can decide the divisional number n by comparing the RIP processing work area of the memory 17 of the page data processor 1 and the data size of the page data PD with each other. Alternatively, the operator of the page data processor 1 may specify the divisional number n for the block division part 1721.

At a step S6, the output processing time calculation part 1713 analyzes the page data PD and calculates the output processing time OT necessary for outputting the plurality of output files RPF in the output unit 2. The output processing time calculation part 1713 analyzes the page data PD and refers to the page size and the resolution of the page expressed by the page data PD for calculating an output area OM. In this case, the output processing time calculation part 1713 obtains the output area OM as the number of pixels.

Then, the output processing time calculation part 1713 calculates the output processing time OT as follows:

$$OT = a \times OM \quad (5)$$

where a represents the inverse of the number of pixels output per unit time (number/sec.) in the output unit 2. In other words, the output processing time calculation part 1713 can obtain the output processing time OT from the relation between the output area OM and the number of pixels output per second.

The output processing time calculation part 1713 may obtain the inverse a from the control information CD transmitted from the output unit 2, or the operator of the page data processor 1 may specify the inverse a for the output processing time calculation part 1713. The output processing time calculation part 1713 may use the resolution of the page data PD specified when the page data PD is created, or the operator of the page data processor 1 may separately specify the resolution of the page data PD.

The output processing time calculation part 1713 may alternatively calculate the output processing time OT as follows:

$$OT = a \times OM + b \quad (5')$$

by adding a parameter b to the right side of the formula (5).

The parameter b is set in consideration of a mechanical or electrical delay in the output unit 2. The output processing of the output files RPF in the output unit 2 includes a delay following mechanical operation or electric processing of the recording part (not shown) comprised in the output unit 2 or receiving of the output files RPF through the communication line CL, and hence an output interrupting time actually caused in the output unit 2 can be reduced by calculating the output processing time OT in consideration of this delay.

The output processing time calculation part 1713 may alternatively refer to the divisional number n decided at the step S5 for calculating the output processing time OT as follows:

$$OT = a \times OM \times \{(n-1)/n\} + b \quad (6)$$

In this case, the output processing time OT is the time necessary for outputting the plurality of output files RPF generated by dividing the intermediate data ND in a process described later. The first term on the right side of the formula (6) expresses the time between that for starting outputting a first output file RPF1 among the n output files RPF generated in the RIP part 172 and that for completely outputting an (n−1)th output file RPFn−1. While the output files RPF1 to RPFn−1 must be ceaselessly and continuously transferred to the output unit 2 to cause no output interrupting time therein, no subsequent output interrupting time of the output unit 2 may be taken into consideration as to a finally generated output file RPFn. When calculating the output processing time OT according to the formula (6), therefore, the actual dead time of the output unit 2 can be estimated as a more appropriate time as compared with the case of calculating the output processing time OT according to the formula (5').

The output processing time calculation part 1713 may calculate the output processing time OT in consideration of an output preparatory time pt in the output unit 2. The output preparatory time pt, necessary for loading the recording medium in the recording part (not shown) of the output unit 2 or warming up the recording part for outputting the output files RPF in the output unit 2, is a necessary and essential step for output processing but does not directly relate to output processing of the output files RPF.

In this case, the output processing time calculation part 1713 obtains the output processing time OT with addition of the output preparatory time pt as follows:

$$OT = pt + [a \times OM \times \{(n-1)/n\} + b] \quad (7)$$

Thus, the output interrupting time in the output unit 2 is further reduced and the dead time of the output unit 2 is estimated to a further appropriate value.

At a step S7, the output start time calculation part 171 refers to the RIP end time RET and the output processing time OT calculated at the steps S4 and S6 respectively and calculates the output start time OST for outputting the plurality of output files RPF in the output unit 2 from the relation between the same and the current time t acquired at the step S2. The output start time calculation part 171 inversely calculates a time corresponding to the output processing time OT from the RIP end time RET thereby obtaining the output start time OST as follows:

$$OST = RET - OT \quad (8)$$

In relation to the formula (4), the formula (8) can be transformed as follows:

$$OST = (t + RT) - OT \quad (8')$$

Therefore, the output start time calculation time 171 may acquire the current time t when carrying out the process of the step S7 for performing calculation. If the output processing time OT is greater than the RIP processing time RT (OT>RT), the output start time OST precedes the current time t. The present invention is not directed to this case.

The process advances to a step S8 so that the RIP part 172 RIP-processes the page data PD and starts generating the intermediate data ND. The RIP part 172 reads the page data PD from the storage part 16 and performs rasterization processing thereby generating the intermediate data ND expressing the contents of the page in the bit map format output-processible by the output unit 2.

At a step S9, the page data processor 1 starts generating the output files RPF. Every time the data size of the intermediate data ND generated from the page data PD due to the RIP processing at the step S8 reaches the size of the block divided by the divisional number n obtained at the step S5, the block division part 1721 divides the intermediate data ND and stores the same as the output files RPF (RPF1, RPF2, . . . , RPFn).

Assuming that S represents the page size of the page expressed by the page data PD, the block size s serving as the criterion for generating the output files RPF by dividing the intermediate data ND can be obtained as follows:

$$s = S/n \quad (9)$$

When the size NDs of the intermediate data ND generated by the RIP part 172 reaches the block size s, the block division part 1721 divides the intermediate data ND theretofore generated, and stores the same in the storage part 16 as the output files RPF. The RIP part 172 continuously RIP-processes the page data PD for generating the intermediate data ND, and the block division part 1721 generates the output files RPF every time the data size NDs of the intermediate data ND reaches the block size s.

Figure 4:
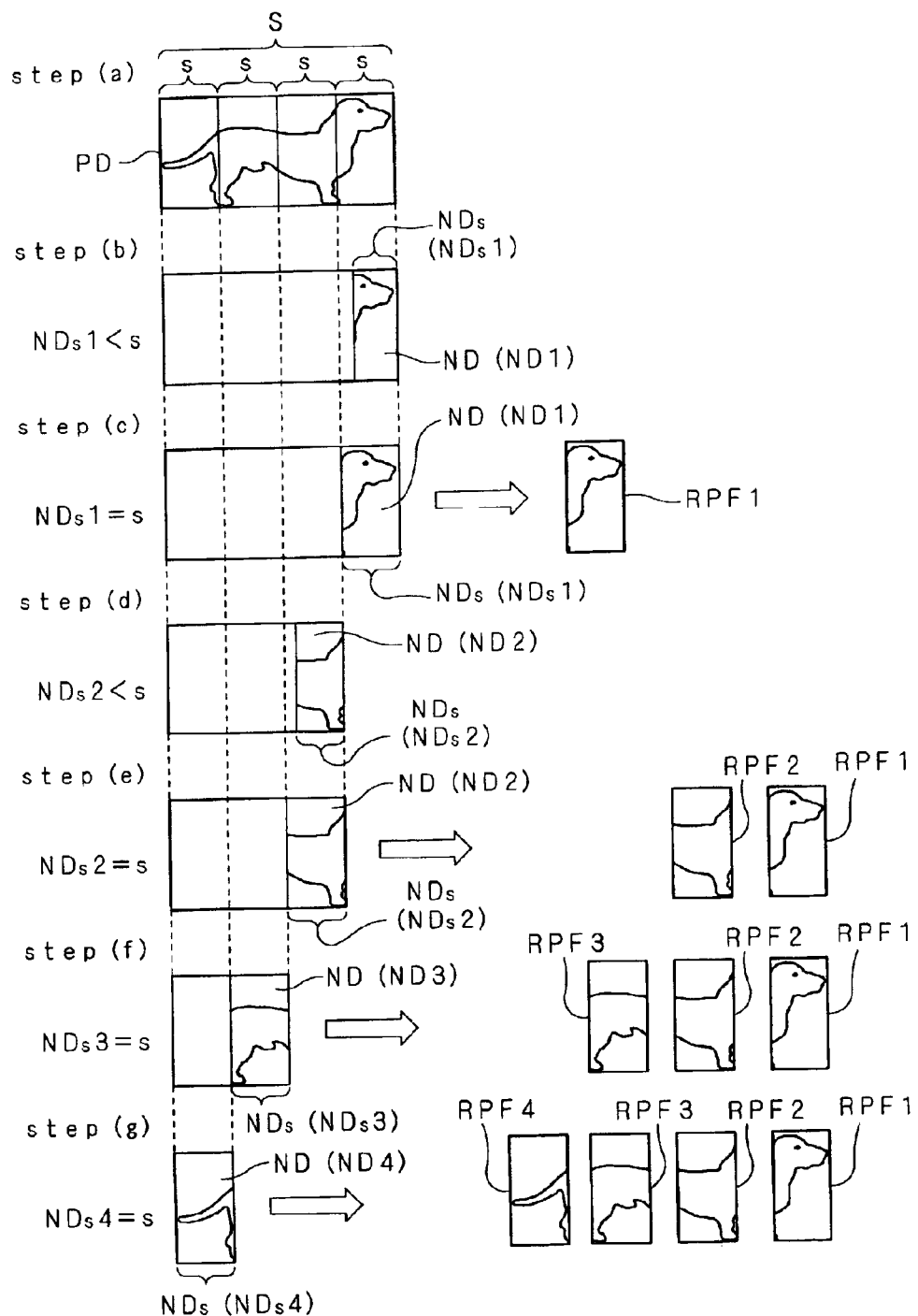
FIG. 4 is a diagram for illustrating processing of division of intermediate data ND and generation of output files RPF performed at a step S9.

FIG. 4 is a diagram for illustrating the processing of dividing the intermediate data ND and generating the output files RPF performed at the step S9. It is assumed that a rectangular page is vertically equally divided into four with a divisional number n of four, as shown at a step (a) in FIG. 4.

At a step (b), the intermediate data ND (ND1) is generated from the page data PD due to the RIP processing at the step S8 so that the data size NDs (NDs1) of the intermediate data ND and the block size s are compared with each other. At the time of the step (b), the data size NDs1 of the intermediate data ND1 is smaller than the block size s and hence the block division part 1721 performs no processing.

At a step (c), the data size NDs1 reaches the block size s. At this time, the block division part 1721 divides the intermediate data ND1 and stores the divided intermediate data ND1 in the storage part 16 as the output file RPF1. The output file RPF1, obtained by dividing the intermediate data ND in the bit map format, includes part of the contents of the page expressed by the page data PD.

The RIP part 172 RIP-processes the page data PD meanwhile, to continuously generate the intermediate data ND expressing the page of the page data PD.

At a step (d), the data size NDs2 of the intermediate data ND2 generated by continuing the RIP processing by the RIP part 172 is compared with the block size s. At this time, the data size NDs2 of the intermediate data ND2 has not yet reached the block size s.

At a step (e), the data size NDs2 of the intermediate data ND2 reaches the block size s. The block division part 1721 divides the intermediate data ND2 and stores the divided intermediate data ND2 in the storage part 16 as the output file RPF2, similarly to the step (c). The output file RPF2, divided from the intermediate data ND generated as a result of the RIP processing performed after storage of the output file RPF1, includes expression following page expression included in the output file RPF1.

Thus, the RIP part 172 RIP-processes the page data PD thereby generating the intermediate data ND and the block division part 1721 divides the intermediate data ND to create the output files RPF every time the data size NDs of the intermediate data ND reaches the block size s, whereby it comes to that the storage part 16 finally stores the plurality of (four in FIG. 4) output files RPF as shown at a step (g). The block division part 1721 divides the intermediate data ND to continuously generate the output files RPF1 to RPF4 sequentially and partially containing the contents of the page expressed by the page data PD respectively.

On the other hand, the data transmission/receiving part 173 acquires the output start time OST calculated at the step S7 and monitors the current time t to determine whether or not the output start time OST has come (step S10). The data transmission/receiving part 173 acquires the current time t through the system clock of the page data processor 1 and compares the same with the output start time OST calculated by the output start time calculation part 171. If the current time t has not yet reached the output start time OST, the data transmission/receiving part 173 keeps waiting and the page data processor 1 continues the operation at the steps S8 and S9. When the current time t acquired by the data transmission/receiving part 173 reaches the output start time OST, the process advances to a step S11.

At the step S11, the data transmission/receiving part 173 transmits the plurality of output files RPF stored in the storage part 16 to the output unit 2 through the communication line CL. When the output start time OST has come, the data transmission/receiving part 173 transmits the foremost output file RPF1 to the output unit 1 among the plurality of output files RPF stored in the storage part 16. When the storage part 16 stores the output files RPF1 to RPF4 created by RIP-processing the page data PD as shown in FIG. 4, the data transmission/receiving part 173 transmits the output file RPF1 to the output unit 2 and thereafter sequentially transfers the output files RPF2, RPF3 and RPF4. The output unit 2 outputs the contents expressed by the page data PD to the recording medium on the basis of the received output files RPF1 to RPF4.

At a step S12, the page data processor 1 determines whether or not the data transmission/receiving part 173 transmits all output files RPF stored in the storage part 16 to the output unit 2. If the data transmission/receiving part 173 transmits all output files RPF stored in the storage part 16, the page data processor 1 ends all processing. If the data transmission/receiving part 173 does not transmit all output files RPF, the process returns to the step S11 so that the data transmission/receiving part 173 repeatedly transmits the output files RPF stored in the storage part 16.

Figure 5A:
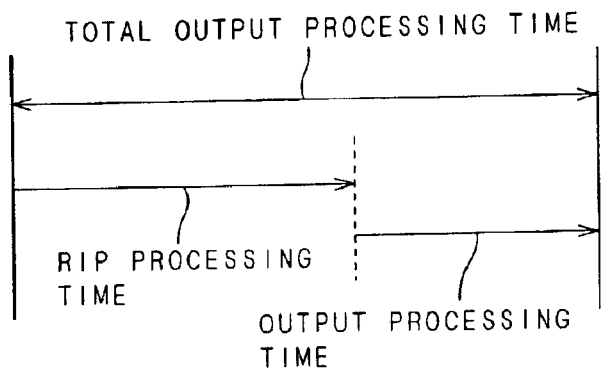
FIGS. 5A to 5C show operation of the page data processor 1 according to the flow chart shown in FIG. 2 in comparison with operation of prior art.
Figure 5B:
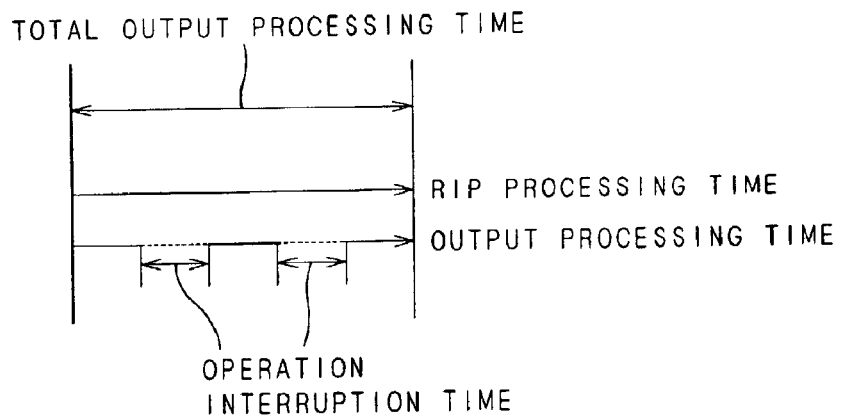
Figure 5C:
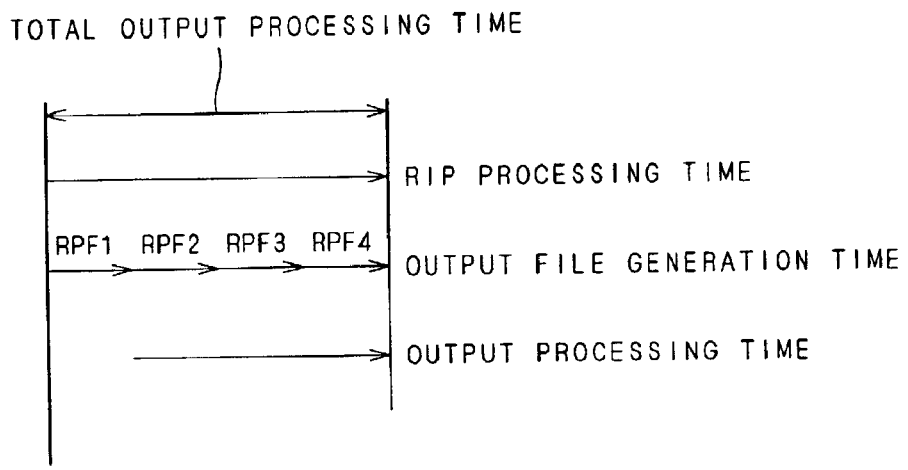

FIGS. 5A to 5C show operation of the page data processor 1 according to the flow chart shown in FIG. 2 in comparison with operation of the prior art. In order to simplify the illustration, it is assumed that the output unit 2 has neither mechanical nor electric delay time.

FIG. 5A is a diagram for illustrating time passage in a case where a prior image processor RIP-processes page data and an output unit thereafter outputs the page data. In this case, a total output processing time required for completely outputting the page data after starting RIP processing is merely the sum of the RIP processing time and the output processing time, and hence it follows that a considerable time is required for completing the overall output processing. Further, the output unit is in a dormant state while the image processor performs RIP processing, leading to remarkably inferior efficiency.

FIG. 5B is a diagram for illustrating time passage in a case of the so-called "on-the-fly processing" where the output unit starts output processing simultaneously with the prior image processor performing RIP processing. In such on-the-fly processing, the output unit simultaneously operates as the image processor starts RIP processing and immediately executes output processing as soon as the image processor RIP-processes the page data, and hence the total output processing time is reduced as compared with that shown in FIG. 5A. Further, the output unit has no dead time. If the RIP speed of the image processor and the output speed of the output unit are uncoincident with each other, however, the output unit must buffer the output data if the RIP speed is faster than the output speed, for example, while an output interrupting time is caused in the output unit before transmitting the output data if the output speed is faster than the RIP speed.

When the present invention is applied to the image processor, the image processor calculates the output start time from the RIP end time, divides the output data into a plurality of output files and transfers the output files to the output unit for starting outputting the same at the output start time calculated from the RIP end time. Thus, the total output processing time can be suppressed to a period similar to that in on-the-fly processing as shown in FIG. 5C, and the output unit may not buffer the output data. Further, the image processor sequentially outputs the plurality of output files to the output unit, not to interrupt the operation of the output unit.

Thus, when the page data processor 1 shown in FIG. 1 performs the operation of the flow chart shown in FIG. 2, it is possible to overcome the disadvantages of the prior art for reducing the dead time or the output interrupting time of the output unit. Consequently, efficiency of printing/prepress steps can be improved.

While the invention has been shown and described in detail, the foregoing description is in all aspects illustrative and not restrictive. It is therefore understood that numerous modifications and variations can be devised without departing from the scope of the invention.

What is claimed is:

1. A page data processor for processing page data described in a page description language, comprising:
    a) a rasterization processing element for rasterizing said page data and generating output data output-processible by an output device;
    b) a data transmission element for transmitting said output data to said output device;
    c) a first time calculation element for calculating a rasterization processing time necessary for generating said output data;
    d) a second time calculation element for calculating an output processing time required by said output device for output-processing said output data; and
    e) an output start time calculation element for calculating an output start time for starting outputting said output data from said output device on the basis of the current time, said rasterization processing time and said output processing time, wherein
    said rasterization processing element further comprises a data division element,
    said data division element divides said output data into a plurality of output files by generating one of said output files every time said page data rasterized reaches a prescribed data size, and
    said data transmission element transmits said output data to said output device for each of said plurality of output files at said output start time.

2. The page data processor according to claim 1, wherein said output start time calculation element obtains said output start time by calculating the time traced back by said output processing time from the time after a lapse of said rasterization processing time from the current time.

3. The page data processor according to claim 2, wherein said output start time calculation element calculates said output start time with addition of a time required by said output device for output preparation.

4. A page data processing method for processing page data described in a page description language, comprising:
    a) a rasterization processing step of rasterizing said page data thereby generating output data output-processible by an output device;
    b) a data transmission step of transmitting said output data to said output device;
    c) a first time calculation step of calculating a rasterization processing time necessary for generating said output data;
    d) a second time calculation step of calculating an output processing time required by said output device for output-processing said output data; and
    e) an output start time calculation step of calculating an output start time for starting outputting said output data from said output device on the basis of the current time, said rasterization processing time and said output processing time, wherein
    said rasterization processing step further comprises a data division step,
    said output data is divided into a plurality of output files by generating one of said output files every time said page data rasterized reaches a prescribed data size in said data division step, and
    said output data is output and transmitted to said output device for each of said output files at said output start time in said data transmission step.

5. The page data processing method according to claim 4, wherein
    said output start time calculation element obtains said output start time by calculating the time traced back by said output processing time from the time after a lapse of said rasterization processing time from the current time.

6. The page data processing method according to claim 5, wherein
    said output start time is calculated with addition of a time required by said output device for output preparation in said output start time calculation step.

7. A computer readable medium bearing a program, which, when executed by a computer, causes the computer to implement the following elements:
    a) a rasterization processing element for rasterizing page data and generating output data output-processible by an output device;
    b) a data transmission element for transmitting said output data to said output device;
    c) a first time calculation element for calculating a rasterization processing time necessary for generating said output data;
    d) a second time calculation element for calculating an output processing time required by said output device for output-processing said output data; and
    e) an output start time calculation element for calculating an output start time for starting outputting said output data from said output device on the basis of the current time, said rasterization processing time and said output processing time, wherein
    said rasterization processing element further comprises a data division element,
    said data division element divides said output data into a plurality of output files by generating one of said output files every time said page data rasterized reaches a prescribed data size, and
    said data transmission element transmits said output data to said output device for each of said plurality of output files at said output start time.

* * * * *

UNITED STATES PATENT AND TRADEMARK OFFICE
CERTIFICATE OF CORRECTION

PATENT NO. : 7,061,649 B2
APPLICATION NO. : 10/262959
DATED : June 13, 2006
INVENTOR(S) : Iwata Ikeda et al.

It is certified that error appears in the above-identified patent and that said Letters Patent is hereby corrected as shown below:

TITLE PAGE:
 Item "(30) Foreign Application Priority Data", change the priority application number from "2000-309687" to -- 2001-309687 --.

Signed and Sealed this

Second Day of January, 2007

JON W. DUDAS
*Director of the United States Patent and Trademark Office*